Figure 1:
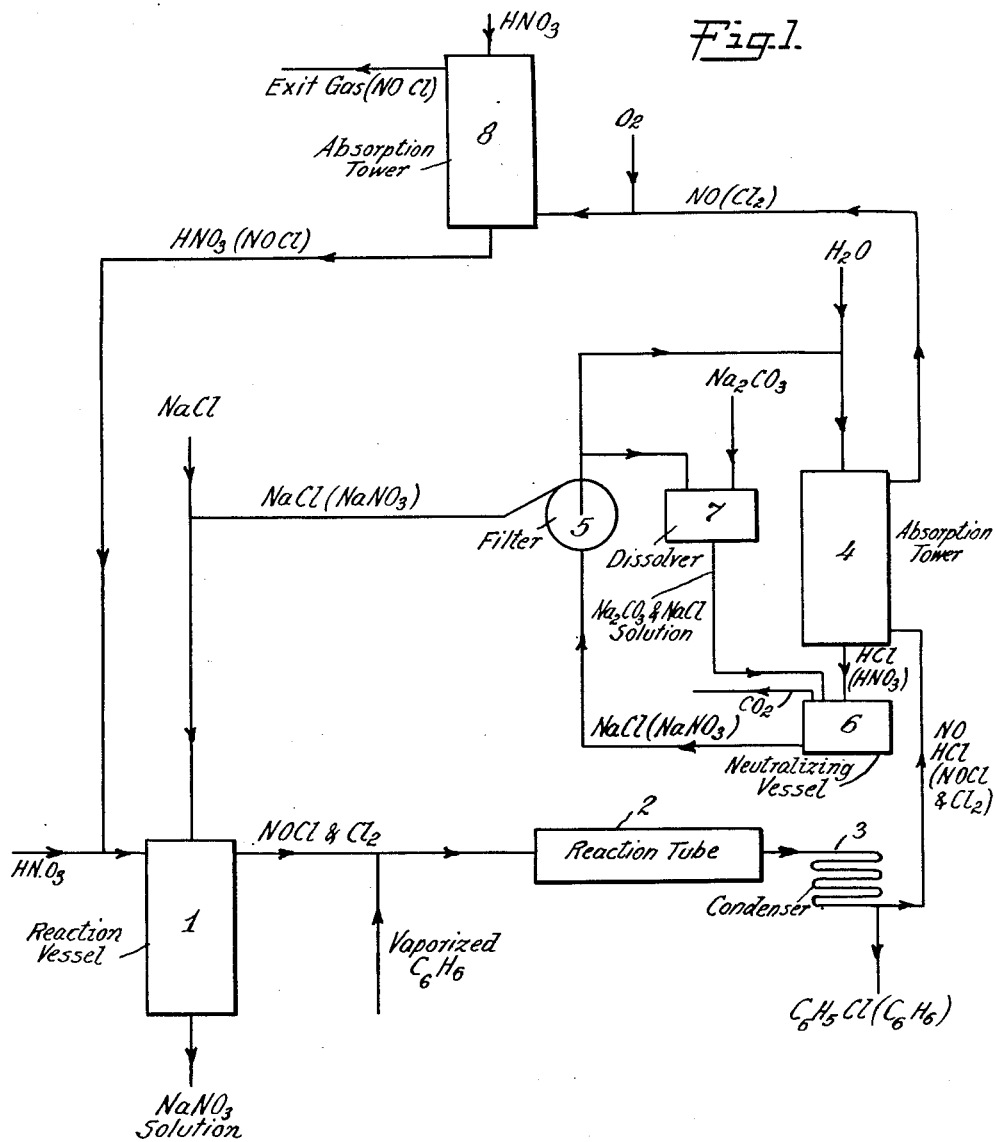

Oct. 3, 1939.  M. F. FOGLER  2,174,574
PROCESS FOR THE PRODUCTION OF NITRATES AND CHLORINATED ORGANIC COMPOUNDS
Filed Feb. 9, 1937  2 Sheets-Sheet 1

INVENTOR
Mayor Farthing Fogler
BY
ATTORNEY

Oct. 3, 1939.   M. F. FOGLER   2,174,574
PROCESS FOR THE PRODUCTION OF NITRATES AND CHLORINATED ORGANIC COMPOUNDS
Filed Feb. 9, 1937   2 Sheets-Sheet 2

INVENTOR
Mayor Farthing Fogler
BY
ATTORNEY

Patented Oct. 3, 1939

2,174,574

UNITED STATES PATENT OFFICE 2,174,574

PROCESS FOR THE PRODUCTION OF NITRATES AND CHLORINATED ORGANIC COMPOUNDS

Mayor Farthing Fogler, Prince George County, Va., assignor to The Solvay Process Company, New York, N. Y., a corporation of New York Application February 9, 1937, Serial No. 124,820

20 Claims. (Cl. 23—102)

This invention relates to processes for the production of a nitrate and a chlorinated hydrocarbon by reaction of a metal chloride with nitric acid to form a gas containing nitrosyl chloride and chlorine, and the treatment of this gas to recover the chlorine content of the nitrosyl chloride as a chlorinated hydrocarbon with the simultaneous liberation of nitric oxide from the nitrosyl chloride. The free chlorine in the gases from the reaction of the metal chloride and nitric acid may also be recovered as a chlorinated hydrocarbon or as free chlorine.

It is known that nitric acid and a metal chloride, for example an alkali metal chloride such as sodium or potassium chloride, an alkaline earth metal chloride such as calcium chloride, and the like, may be reacted with nitric acid to form the corresponding nitrate and evolve a gas mixture containing nitrosyl chloride and chlorine. By separating the chlorine from the nitrosyl chloride about two-thirds of the chlorine originally combined in the chloride salt may be recovered as a chlorine gas. The remaining one-third of the chlorine is in combination with the corresponding quantity of fixed nitrogen as nitrosyl chloride. The recovery of the fixed nitrogen content of this nitrosyl chloride is expensive and yet the practical success of the manufacture of nitrates from nitric acid and metal chloride depends upon a substantially complete utilization of the fixed nitrogen entering the process.

It is also known to make a nitrate by neutralizing nitric acid with a base, for example, sodium carbonate, caustic soda, milk of lime, etc.

It is an object of this invention to modify the process for making a nitrate from a base and nitric acid and to combine the thus modified process with the manufacture of a nitrate by reaction of nitric acid and a metal chloride and the utilization of the nitrosyl chloride, and if desired the chlorine also, in the gases evolved by the reaction of the acid and chloride. By thus modifying and combining the three processes, this invention provides a method whereby the fixed nitrogen entering the process may be substantially completely recovered as nitrate, and the gas containing nitrosyl chloride and chlorine may be treated to utilize it for the production of a valuable by-product.

In carrying out the process of this invention nitric acid and a metal chloride, such as an alkali metal chloride (sodium or potassium chloride) or an alkaline earth metal chloride (calcium chloride), are reacted to form the corresponding nitrate and a gas containing nitrosyl chloride and chlorine. Chlorine in this gas either in the gas combined as nitrosyl chloride or as free chlorine or both, is reacted with an organic compound containing hydrogen replaceable by chlorine to chlorinate it and form a chlorinated organic compound, nitric oxide and hydrogen chloride. The hydrogen chloride is separated from the gas containing nitric oxide and the nitric oxide is reacted with water and oxygen to form nitric acid, which is preferably returned for reaction with metal chloride to form additional nitrate, nitrosyl chloride and chlorine. The separation of the hydrogen chloride from the gas containing nitric oxide may be accomplished by passing the gas in contact with an aqueous liquid, such as water or an aqueous salt solution, to absorb the hydrogen chloride. The resulting solution of hydrogen chloride may be neutralized with a base such as sodium carbonate, calcium oxide or hydroxide, etc. to form the corresponding chloride, which may be returned for reaction with additional nitric acid to form additional nitrate, nitrosyl chloride and chlorine.

Figure 2:
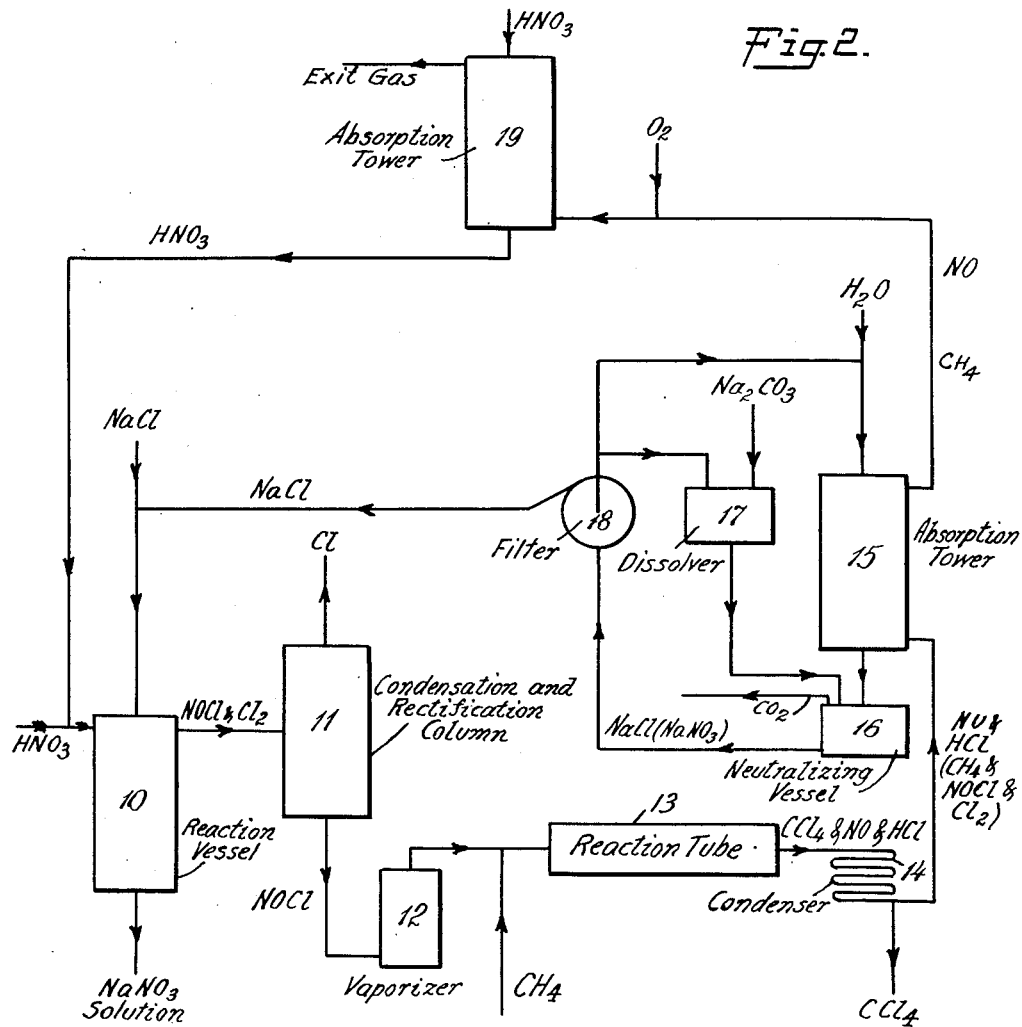

The invention will be more completely described by the following examples, the processes of which are illustrated in the drawings. In the drawings, Fig. 1 illustrates a procedure for the production of sodium nitrate and chlorbenzene, utilizing all of the chlorine content of the gas evolved by reaction of nitric acid and sodium chloride (both the free chlorine and that combined as nitrosyl chloride) for the production of the chlorbenzene. Fig. 2 illustrates a procedure for the production of sodium nitrate and carbon tetrachloride, using only the chlorine content of the gas from the reaction of nitric acid and sodium chloride which is combined as nitrosyl chloride, with the free chlorine of the gas being separately recovered as chlorine gas.

With reference to Fig. 1, sodium chloride and nitric acid introduced into reaction vessel I are heated in this vessel to form sodium nitrate and evolve a gas principally consisting of nitrosyl chloride and chlorine. This gas leaves the top of reaction vessel I and is mixed with vaporized benzene in the proportions of 1 mol of benzene vapor for every mol of nitrosyl chloride and 2 mols of benzene vapor for every 1 mol of free chlorine. The mixture of gases and vapors is then passed through a reaction tube 2 heated to, for example, 425° C. In tube 2 the nitrosyl chloride and chlorine react with the benzene to form principally monochlorbenzene. The gases from reaction tube 2 are cooled in a water-cooled condenser 3 to, for example, 20° C. to condense the chlorbenzene and unreacted benzene from the gases.

The uncondensed gases containing nitric oxide and hydrochloric acid are passed into the bottom of an absorption tower 4 in which they are scrubbed with a substantially saturated aqueous solution of sodium chloride supplied to absorption tower 4 from a filter 5. The hydrogen chloride is absorbed in the solution. The solution or slurry leaving the bottom of absorption tower 4 passes to a neutralizing vessel 6 where it is mixed with a solution of sodium carbonate substantially saturated with sodium chloride coming from a dissolver 7. The hydrochloric acid is neutralized with the sodium carbonate with the formation of sodium chloride which crystallizes from the solution. The solution containing solid sodium chloride then passes from neutralizing vessel 6 to filter 5 where the solid sodium chloride is separated from the solution. The solid chloride is returned to reaction vessel 1. The saturated sodium chloride solution in filter 5 is in part returned to the top of absorption tower 4 as described above. Another part of the sodium chloride solution from filter 5 is passed into neutralizing vessel 6 as described above.

The gases leaving the top of absorption tower 4 contain nitric oxide. Oxygen is added to this gas and it is then introduced into the bottom of an absorption tower 8. In tower 8 the gas is scrubbed with aqueous nitric acid and the nitric oxide, oxygen and water in the nitric acid react to form nitric acid. The nitric acid flowing from the bottom of tower 8 is passed to reaction vessel 1.

Any unreacted nitrosyl chloride and chlorine in the gases leaving reaction tube 2 pass to absorption tower 4. In this tower the nitrosyl chloride will react to form hydrochloric acid and nitric acid with the evolution of nitric oxide. This hydrochloric and nitric acid formed by the reaction of nitrosyl chloride in absorption tower 4 will be neutralized by the addition of sodium carbonate to the solution in neutralizing vessel 6 forming sodium chloride and sodium nitrate. If the gas entering absorption tower 4 contains considerable proportions of nitrosyl chloride the sodium nitrate content of the sodium chloride solution which is circulated through absorption tower 4 and neutralizing vessel 6 will build up until the solution becomes saturated with sodium nitrate. At this point, as additional sodium nitrate is formed in neutralizing vessel 6, it will crystallize out with the sodium chloride and be removed in filter 5 and returned to reaction vessel 1 with the sodium chloride returned to that vessel. The sodium nitrate thus formed in neutralizing vessel 6 will be withdrawn from the process in the solution leaving the bottom of reaction vessel 1.

Chlorine in the gas entering absorption tower 4 will be absorbed in large part, reacting as follows:

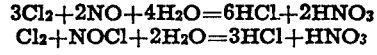

$$3Cl_2 + 2NO + 4H_2O = 6HCl + 2HNO_3$$
$$Cl_2 + NOCl + 2H_2O = 3HCl + HNO_3$$

Any chlorine passing through absorption tower 4 will react in absorption tower 8 to form nitrosyl chloride. Depending upon the amount of chlorine present in the gas entering tower 8, the nitrosyl chloride formed will leave absorption tower 8 either in solution in the nitric acid drawn from this tower and passed to reaction vessel 1 or in part in solution in the nitric acid and in part in the exit gas leaving the top of absorption tower 8. The nitrosyl chloride accompanying the nitric acid passed to reaction vessel 1 will be evolved from the acid in this vessel and again passed to reaction tube 2 where it serves for the treatment of additional benzene. Any small amounts of nitrosyl chloride in the exit gas from absorption tower 8 may be vented from the process or the gas may be treated to recover the nitrosyl chloride.

With reference to Fig. 2, sodium chloride and nitric acid are reacted in a reaction vessel 10 to form a solution of sodium nitrate which is withdrawn from the bottom of this vessel and a gas containing nitrosyl chloride and chlorine which passes out of the top of the vessel. The nitrosyl chloride and chlorine gas is introduced into a condensation and rectification column 11 in which the nitrosyl chloride is liquefied and separated from the chlorine. The chlorine escapes from the top of column 11 while the liquid nitrosyl chloride leaves the bottom of the column and is passed to a vaporizer 12. The nitrosyl chloride is vaporized in vaporizer 12 and is mixed with gaseous methane and the mixture passed into a reaction tube 13. The nitrosyl chloride and methane are mixed in the proportions of 8.7 mols of NOCl to 1 mol of methane. In reaction tube 13 the mixture of gases is heated to 400° C. and the methane and nitrosyl chloride react with the formation of carbon tetrachloride, nitric oxide and hydrogen chloride. The gases and vapors leaving reaction tube 13 are cooled in a condenser 14 to liquefy the carbon tetrachloride. The gas containing nitric oxide and hydrogen chloride together with any unreacted methane and nitrosyl chloride and chlorine formed by decomposition of nitrosyl chloride in reaction tube 13 passes into the bottom of absorption tower 15.

In absorption tower 15 the nitric oxide and hydrogen chloride gas is contacted with a substantially saturated solution of sodium chloride in the same manner as described above in connection with the process of Fig. 1. The sodium chloride is introduced to the top of the tower and the resulting solution of sodium chloride and hydrochloric acid passes from the bottom of the tower to a neutralizing vessel 16 where it is mixed with a solution of sodium carbonate and sodium chloride coming from a dissolver 17. The sodium carbonate reacts with hydrochloric acid forming sodium chloride which crystallizes from solution and is removed in a filter 18 and returned to reaction vessel 10. The solution of sodium chloride from filter 18 is passed in part to absorption tower 15 and in part to dissolver 17 and is used for dissolving sodium carbonate to prepare the solution used for neutralizing the hydrochloric acid in the solution from absorption tower 15 passed to neutralizing vessel 16.

From the top of absorption tower 15 the gas containing nitric oxide passes to absorption tower 19 after addition of oxygen and in tower 19 is treated with aqueous nitric acid solution. The nitric oxide and oxygen react with the water in the aqueous solution to form nitric acid and the nitric acid leaving the bottom of absorption tower 19 is returned to reaction vessel 10.

Organic compounds containing hydrogen replaceable by chlorine other than benzene and methane may be employed in carrying out the process of this invention. Thus, in the process of Examples 1 and 2 the benzene and methane may be substituted by other aliphatic hydrocarbons (ethane, propane, butane, pentane, etc.) or by other aromatic hydrocarbons (naphthalene, diphenyl, etc.). Alicyclic hydrocarbons, hydrocarbons of the mixed aliphatic-aromatic type, or the halogen substitution products of the hydrocarbons may be employed in carrying out this invention. The particular temperatures to be maintained in reacting the nitrosyl chloride and chlorine with the organic compounds will vary according to the organic compound treated and the degree of chlorination of the organic compound desired. In general, a mixture of the hydrocarbon in vapor form and the nitrosyl chloride and chlorine are heated to temperatures above 200° C. Catalysts may be employed to assist the chlorination reaction.

I claim:

1. The process for the production of a nitrate and a chlorinated organic compound which comprises the steps of (1) reacting nitric acid with a metal chloride to form the corresponding metal nitrate, and a gas containing nitrosyl chloride and chlorine, (2) reacting the nitrosyl chloride in said gas with an organic compound containing hydrogen replaceable by chlorine to form a chlorinated compound and a gas containing nitric oxide and hydrogen chloride, (3) passing the gas from step (2) in contact with an aqueous liquor to absorb the hydrogen chloride and separate it from the nitric oxide, (4) reacting said nitric oxide with water and oxygen to form nitric acid, and (5) returning the nitric acid from step (4) to step (1) for reaction to form additional metal nitrate.

2. The process for the production of a nitrate and a chlorinated organic compound which comprises the steps of (1) reacting nitric acid with a metal chloride to form the corresponding metal nitrate, and a gas containing nitrosyl chloride and chlorine, (2) reacting the nitrosyl chloride in said gas with an organic compound containing hydrogen replaceable by chlorine to form a chlorinated compound and a gas containing nitric oxide and hydrogen chloride, (3) separating hydrogen chloride from the gas and neutralizing it with a base to form the corresponding metal chloride, (4) reacting said nitric oxide with water and oxygen to form nitric acid, and (5) returning the metal chloride and nitric acid from steps (3) and (4) to step (1) for reaction to form additional metal nitrate.

3. The process for the production of a nitrate and a chlorinated hydrocarbon which comprises the steps of (1) reacting nitric acid with a metal chloride to form the corresponding metal nitrate, and a gas containing nitrosyl chloride and chlorine, (2) reacting the nitrosyl chloride in said gas with a hydrocarbon to form a chlorinated hydrocarbon and a gas containing nitric oxide and hydrogen chloride, (3) separating hydrogen chloride from the gas and neutralizing it with a base to form the corresponding metal chloride, (4) reacting said nitric oxide with water and oxygen to form nitric acid, and (5) returning the metal chloride and nitric acid from steps (3) and (4) to step (1) for reaction to form additional metal nitrate.

4. The process for the production of sodium nitrate and chlorbenzene which comprises the steps of (1) reacting nitric acid with sodium chloride to form sodium nitrate and a gas containing nitrosyl chloride and chlorine, (2) reacting the nitrosyl chloride of said gas with benzene to form chlorbenzene and a gas containing nitric oxide, hydrogen chloride and unreacted nitrosyl chloride, (3) passing the gas from step (2) in contact with an aqueous liquor to absorb the hydrogen chloride and decompose the residual nitrosyl chloride, neutralizing the acids formed thereby with sodium carbonate to form sodium salts, (4) reacting the nitric oxide in the gas from step (3) with water and oxygen to form nitric acid, and (5) returning the sodium salts and nitric acid from steps (3) and (4) to step (1) for reaction to form additional sodium nitrate.

5. The process for the production of a nitrate and a chlorinated hydrocarbon which comprises the steps of (1) reacting nitric acid with a metal chloride to form the corresponding metal nitrate and a gas containing nitrosyl chloride and chlorine, (2) passing said gas into contact with a hydrocarbon under conditions such that the chlorine and nitrosyl chloride react with the hydrocarbon to form a chlorinated hydrocarbon and a gas containing nitric oxide and hydrogen chloride, (3) separating said hydrogen chloride from the gas and neutralizing it with a base to form the corresponding metal chloride, (4) reacting said nitric oxide with water and oxygen to form nitric acid, and (5) returning the metal chloride and nitric acid from steps (3) and (4) to step (1) for reaction to form additional metal nitrate.

6. The process for the production of sodium nitrate and chlorbenzene which comprises the steps of (1) reacting nitric acid with sodium chloride to form sodium nitrate and a gas containing nitrosyl chloride and chlorine, (2) passing said gas into contact with benzene under conditions such that the chlorine and nitrosyl chloride react with the benzene to form a chlorbenzene and a gas containing nitric oxide and hydrogen chloride, (3) separating said hydrogen chloride from the gas and neutralizing it with a base to form the corresponding metal chloride, (4) reacting said nitric oxide with water and oxygen to form nitric acid, and (5) returning the metal chloride and nitric acid from steps (3) and (4) to step (1) for reaction to form additional metal nitrate.

7. The process for the production of sodium nitrate and chlorbenzene which comprises the steps of (1) reacting nitric acid with sodium chloride to form sodium nitrate and a gas containing nitrosyl chloride and chlorine, (2) passing said gas into contact with benzene under conditions such that the chlorine and nitrosyl chloride reaction with the benzene to form a chlorbenzene and a gas containing nitric oxide and hydrogen chloride, (3) absorbing said hydrogen chloride in an aqueous solution of sodium chloride substantially saturated with the sodium chloride and neutralizing the hydrochloric acid thus formed with a sodium base to form sodium chloride and to crystallize solid sodium chloride from the aqueous solution, (4) reacting the nitric oxide unabsorbed in step (3) with water and oxygen to form nitric acid, and (5) returning the solid sodium chloride from step (3) and the nitric acid from step (4) to step (1) for reaction to form additional sodium nitrate.

8. The process for the production of a nitrate and a chlorinated organic compound which comprises the steps of (1) reacting nitric acid with a metal chloride to form the corresponding metal nitrate, and a gas containing nitrosyl chloride and chlorine, (2) reacting the nitrosyl chloride in said gas with an organic compound containing hydrogen replaceable by chlorine to form a chlorinated compound and a gas containing nitric oxide and hydrogen chloride, (3) separating hydrogen chloride from the gas and neutralizing it with a base to form the corresponding metal chloride, and (4) returning the metal chloride from step (3) to step (1) for reaction to form additional metal nitrate.

9. The process for the production of a nitrate and a chlorinated organic compound which comprises the steps of (1) reacting nitric acid with a metal chloride to form the corresponding metal nitrate, and a gas containing nitrosyl chloride and chlorine, (2) reacting the nitrosyl chloride in said gas with an organic compound containing hydrogen replaceable by chlorine to form a chlorinated compound and a gas containing nitric oxide and hydrogen chloride, separating hydrogen chloride from the nitric oxide in said gas, (3) reacting said nitric oxide with water and oxygen to form nitric acid, and (4) returning the nitric acid from step (3) to step (1) for reaction to form additional metal nitrate.

10. The process for the production of a nitrate and a chlorinated organic compound which comprises the steps of (1) reacting nitric acid with a metal chloride to form the corresponding metal nitrate, and a gas containing nitrosyl chloride and chlorine, (2) reacting chlorine in said gas with an organic compound containing hydrogen replaceable by chlorine to form a chlorinated compound and a gas containing hydrogen chloride, (3) separating the hydrogen chloride from said gas and neutralizing it with a base to form the corresponding metal chloride, and (4) returning the metal chloride from step (3) to step (1) for reaction to form additional metal nitrate.

11. The process for the production of a nitrate and a chlorinated organic compound which comprises the steps of (1) reacting nitric acid with a metal chloride to form the corresponding metal nitrate, and a gas containing nitrosyl chloride and chlorine, (2) reacting chlorine in said gas with benzene to form a chlorinated compound and a gas containing hydrogen chloride, (3) separating the hydrogen chloride from said gas and neutralizing it with a base to form the corresponding metal chloride, and (4) returning the metal chloride from step (3) to step (1) for reaction to form additional metal nitrate.

12. The process for the production of sodium nitrate and carbon tetrachloride which comprises the steps of (1) reacting nitric acid with sodium chloride to form sodium nitrate and a gas containing nitrosyl chloride and chlorine, (2) reacting the nitrosyl chloride of said gas with methane to form carbon tetrachloride and a gas containing nitric oxide and hydrogen chloride, (3) separating said hydrogen chloride from the gas and neutralizing it with sodium carbonate to form sodium chloride, (4) reacting said nitric oxide with water and oxygen to form nitric acid, and (5) returning the sodium chloride and nitric acid from steps (3) and (4) to step (1) for reaction to form additional sodium nitrate.

13. The process for the production of sodium nitrate and carbon tetrachloride which comprises the steps of (1) reacting nitric acid with sodium chloride to form sodium nitrate and a gas containing nitrosyl chloride and chlorine, (2) separating the chlorine from the nitrosyl chloride in said gas, (3) reacting the nitrosyl chloride with methane to form carbon tetrachloride and a gas containing nitric oxide and hydrogen chloride, (4) separating said hydrogen chloride from the gas and neutralizing it with a base to form the corresponding metal chloride, (5) reacting said nitric oxide with water and oxygen to form nitric acid, and (6) returning the metal chloride and nitric acid from steps (4) and (5) to step (1) for reaction to form additional metal nitrate.

14. The process for the production of a nitrate and a chlorinated organic compound which comprises the steps of (1) reacting nitric acid with a metal chloride to form the corresponding metal nitrate and a gas containing nitrosyl chloride and chlorine, (2) reacting the nitrosyl chloride in said gas with an organic compound containing hydrogen replaceable by chlorine to form a chlorinated compound and a gas containing nitric oxide and hydrogen chloride, (3) separating said chlorinated compound from the gas containing nitric oxide and hydrogen chloride, (4) separating the hydrogen chloride from the nitric oxide in said gas, (5) reacting said nitric oxide with water and oxygen to form nitric acid, and (6) returning the nitric acid from step (5) to step (1) for reaction to form additional metal nitrate.

15. The process for the production of a nitrate and a chlorinated organic compound which comprises the steps of (1) reacting nitric acid with a metal chloride to form the corresponding metal nitrate and a gas containing nitrosyl chloride and chlorine, (2) reacting chlorine in said gas with an organic compound containing hydrogen replaceable by chlorine to form a chlorinated compound and a gas containing hydrogen chloride, (3) separating said chlorinated compound from the gas containing hydrogen chloride, (4) separating the hydrogen chloride from said gas and neutralizing it with a base to form the corresponding metal chloride, and (5) returning the metal chloride from step (4) to step (1) for reaction to form additional metal nitrate.

16. The process for the production of a nitrate and a chlorinated hydrocarbon which comprises the steps of (1) reacting nitric acid with a metal chloride to form the corresponding metal nitrate and a gas containing nitrosyl chloride and chlorine, (2) reacting the nitrosyl chloride in said gas with a hydrocarbon to form a chlorinated hydrocarbon and a gas containing nitric oxide and hydrogen chloride, (3) separating said chlorinated hydrocarbon from the gas containing nitric oxide and hydrogen chloride, (4) separating said hydrogen chloride from the gas and neutralizing it with a base to form the corresponding metal chloride, (5) reacting said nitric oxide with water and oxygen to form nitric acid, and (6) returning the metal chloride and nitric acid from steps (4) and (5) to step (1) for reaction to form additional metal nitrate.

17. The process for the production of sodium nitrate and chlorbenzene which comprises the steps of (1) reacting nitric acid with sodium chloride to form sodium nitrate and a gas containing nitrosyl chloride and chlorine, (2) passing said gas into contact with benzene under conditions such that the chlorine and nitrosyl chloride react with the benzene to form a chlorbenzene and a gas containing nitric oxide, hydrogen chloride and unreacted nitrosyl chloride, (3) separating said chlorbenzene from the gas containing nitric oxide, hydrogen chloride and unreacted nitrosyl chloride, (4) absorbing said hydrogen chloride and decomposing said nitrosyl chloride in an aqueous liquid substantially saturated with sodium chloride to form hydrochloric acid and nitric acid, and neutralizing the acids thus formed with a sodium base to form sodium chloride and sodium nitrate, (5) reacting the nitric oxide unabsorbed in step (4) with water and oxygen to form nitric acid, and (6) returning the sodium salts from step (4) and the nitric acid from step (5) to step (1) for reaction to form additional sodium nitrate.

18. The process for the production of sodium nitrate and carbon tetrachloride which comprises the steps of (1) reacting nitric acid with sodium chloride to form sodium nitrate and a gas containing nitrosyl chloride and chlorine, (2) separating the chlorine from the nitrosyl chloride in said gas, (3) reacting the nitrosyl chloride with methane to form carbon tetrachloride and a gas containing nitric oxide, hydrogen chloride and unreacted nitrosyl chloride, (4) separating said carbon tetrachloride from the gas containing nitric oxide, hydrogen chloride and unreacted nitrosyl chloride, (5) absorbing said hydrogen chloride and decomposing said residual nitrosyl chloride in the gas with an aqueous liquid to form hydrochloric and nitric acids, neutralizing these acids with a base to form the corresponding metal salts, (6) reacting the nitric oxide in the gas from step (5) with water and oxygen to form nitric acid, and (7) returning the metal salts and the nitric acid from steps (5) and (6) to step (1) for reaction to form additional metal nitrate.

19. The process for the production of a nitrate and a chlorinated organic compound which comprises the steps of (1) reacting nitric acid with a metal chloride to form the corresponding metal nitrate, (2) reacting nitrosyl chloride in said gas with an organic compound containing hydrogen replaceable by chlorine to form a chlorinated compound and a gas containing nitric oxide, hydrogen chloride and unreacted nitrosyl chloride, (3) separating said chlorinated compound from said gas, (4) passing said gas in contact with an aqueous liquor to absorb the hydrogen chloride and decompose the nitrosyl chloride, (5) treating the gas from step (4), comprising nitric oxide substantially free from nitrosyl chloride, with water and oxygen to form nitric acid, and (6) returning the nitric acid from step (5) to step (1) for reaction to form additional metal nitrate.

20. The process for the production of a nitrate and a chlorinated organic compound which comprises the steps of (1) reacting nitric acid with a metal chloride to form the corresponding metal nitrate and a gas containing nitrosyl chloride and chlorine, (2) reacting nitrosyl chloride in said gas with an organic compound to form a chlorinated compound and a gas containing nitric oxide and unreacted nitrosyl chloride, (3) separating said chlorinated compound from said gas, (4) passing said gas in contact with an aqueous liquid to decompose the residual nitrosyl chloride and separate it from the nitric oxide, with the formation in said aqueous liquid of hydrochloric and nitric acids, (5) neutralizing said acids with a base to form the corresponding metal salts, and (6) returning the metal salts from step (5) to step (1) for reaction to form additional metal nitrate.

MAYOR FARTHING FOGLER.